United States Patent

Grimm et al.

Patent Number: 5,562,417
Date of Patent: Oct. 8, 1996

[54] CONTROL MECHANISM FOR RAM AIR TURBINE

[75] Inventors: Duane Grimm; David G. Bannon; Richard Walsh, all of Rockford, Ill.

[73] Assignee: Sundstrand Corporation, Rockford, Ill.

[21] Appl. No.: 288,526

[22] Filed: Aug. 10, 1994

[51] Int. Cl.$^6$ ............................................. F01D 7/02
[52] U.S. Cl. .................................. 416/137; 416/152
[58] Field of Search ................................. 416/137, 152, 416/153, 165

[56] References Cited

U.S. PATENT DOCUMENTS

| | | | |
|---|---|---|---|
| 2,874,787 | 2/1959 | Battenberg et al. | 416/51 A X |
| 2,970,652 | 2/1961 | Breaux et al. | |
| 2,997,109 | 8/1961 | Blackburn | 416/137 |
| 3,037,559 | 6/1962 | Blackburn. | |
| 3,063,503 | 11/1962 | Blackburn. | |
| 3,149,678 | 9/1964 | Chilman et al. | |
| 4,411,596 | 10/1983 | Chilman | 416/137 |
| 4,701,104 | 10/1987 | Cohen | 416/44 |
| 4,743,163 | 5/1988 | Marunas et al. | 416/137 |
| 5,257,907 | 11/1993 | Seidel | 416/137 |

*Primary Examiner*—Edward K. Look
*Assistant Examiner*—Michael S. Lee
*Attorney, Agent, or Firm*—Ryan M. Fountain

[57] ABSTRACT

A control mechanism is provided which feathers the propeller blade pitch during stopping and stores restart energy in the blade pitch governor mechanism. Deceleration to the feathered mode is aided by the airstream. During restart, excess stored energy is used to increase reliability, but is then dissipated mechanically, as by a flywheel mechanism, to maintain low internal impact stresses. More specifically, where single governor spring is used for controlling the pitch of all propeller blades, a braked ball screw device is used to compress that spring during stoppage. Upon restart, the governor spring expands and causes blade pitch change. The ball screw arrangement then dissipates a large portion of the excess energy through torque transmission to mechanical components.

13 Claims, 2 Drawing Sheets

CONTROL MECHANISM FOR RAM AIR TURBINE

BACKGROUND AND SUMMARY OF THE INVENTION

The present invention relates to control mechanisms for propeller driven apparatus, such as turbines, motors or generators, extracting power from a fluid stream. Particular applications include ram air turbines (RATs) mounted on aircraft wing-borne refueling pods.

Propeller driven turbines, for example, are typically placed in a fluid stream such that the flow of fluid causes the propellers to rotate. That rotation can be used to generate mechanical, hydraulic or electric power for a variety of purposes. It is often desirable in such applications to control the starting and stopping of propeller rotation without withdrawing the apparatus from the fluid stream.

Various control mechanisms have been suggested for use with such apparatus. In certain applications, such as airborne power sources, performance of many control mechanisms have been less than desired. For example, with RATs used on aircraft refueling pods the control mechanisms are subject to significant environmental extremes as a result of altitude variation and local climate. Prior devices to control stopping and restarting of airborne RATs have been found to be insufficiently reliable in several respects. First, the restart mechanisms were not sufficiently energetic to consistently assure restart on command and reliable speed control over long periods of use. In part, this is believed to be because of weight constraints and in part because more energetic restart mechanisms applied more destructure stresses and wear to components which would result in either higher material costs and/or greater instances of repair.

Also, prior devices tended to be overly complicated and have a high number of components (with the resulting tight tolerance constraints), thus also increasing the costs of manufacture and repair. In addition, prior devices had an unacceptable number of hazardous failure modes. Further, some prior devices included control mechanisms which did not fully feather the blades during nonuse, thus creating increased aerodynamic drag in the airstream.

Accordingly, it is an object of the present invention to provide an improved control mechanism for propeller driven devices, such as RATs. Other objects include the provision of a robust control mechanism that:

1. permits reliable and consistent stopping and restarting in the fluid stream,
2. provides reliable, safe speed control during start-up and normal operation;
3. has a minimal number of parts and is relatively simple to manufacture and/or repair,
4. is minimally affected by use in a hostile environment,
5. has minimal hazardous failure modes,
6. provides a large safety factor on useful life, and
7. avoids dependency on tight tolerances.

These and other objects are attained by the provision of a control mechanism which feathers the propeller blade pitch during stopping and stores restart energy in the blade pitch governor mechanism. Deceleration to the feathered mode is aided by the airstream. During restart, excess stored energy is used to increase reliability, but is then dissipated mechanically, as by a flywheel mechanism, to maintain low internal impact stresses. More specifically, where single governor spring is used for controlling the pitch of all propeller blades, a braked ball screw device is used to compress that spring during stoppage. Upon restart, the governor spring expands and causes blade pitch change. The ball screw arrangement then dissipates a large portion of the excess energy through torque transmission to mechanical components.

Other objects, advantages and novel features of the present invention will now become readily apparent to those of skill in the art from the following drawings and description of preferred embodiments.

DESCRIPTION OF THE PREFERRED EMBODIMENT

Figure 1:
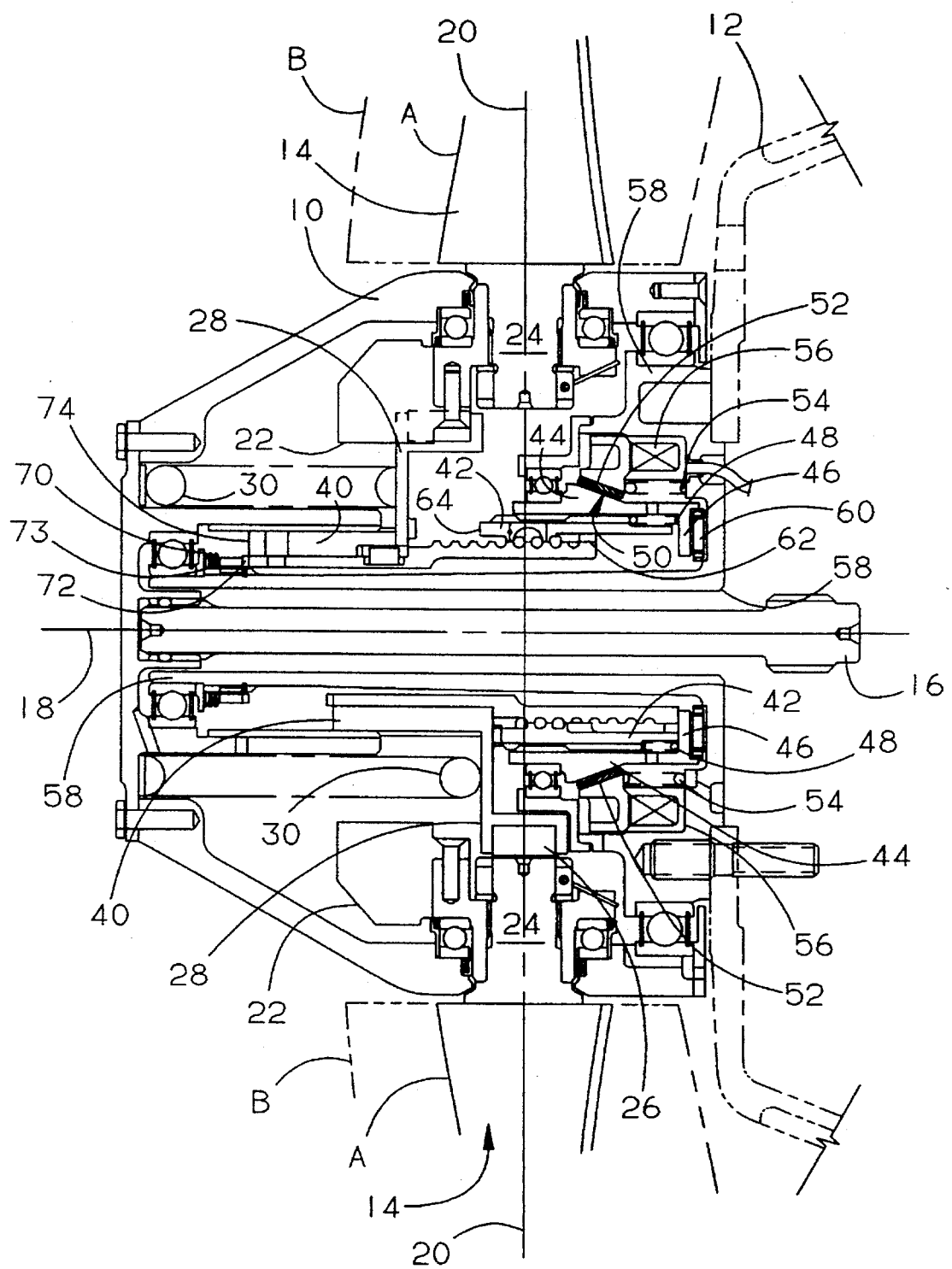
FIG. 1 is a cross sectional view of a portion of a RAT incorporating the teachings of the present invention.

FIG. 1, which illustrates a preferred embodiment of the present invention, shows a forward portion of an aircraft Ram Air Turbine (RAT). Such RATs can be employed for emergency power and mounted to the aircraft fuselage or for intermittent or auxiliary power and mounted to an external pod, such as a refueling pod. The present invention has particular application to those pod mounted RATs.

In FIG. 1, a hub 10 is provided on a forward end of pod 12. Hub 10 has a plurality of propellers 14 mounted therein. A rotatable drive shaft 16 is fixed to hub 10 and extends rearwardly (to the right in the drawing) to provide a power source for pod 12. Hub 10 is rotatable about axis 18 and is so driven by the force imparted to propellers 14 as they move through the airstream (being drawn by the aircraft in flight).

Propellers 14 rotate about axis 18 to provide motive power through drive shaft 16 and are also rotatable about axis 20 to adjust the blade pitch. The purposes of propeller pitch adjustment are well known and will not be discussed at length herein except to note that the pitch of these propellers is adjustable between feathered, fine pitch and coarse pitch positions. Various conventional pitch adjustment mechanisms are known and well suited for use with the present invention. The pitch adjustment mechanism especially preferred for use with the present invention is also currently well known and publicly marketed by the assignee of the present invention in part number 757741. This mechanism includes a governor arrangement that balances centrifugal forces from counterweight assemblies through an integral lever arm and operating pin, into a yoke plate, and against a governor spring to establish the appropriate blade angle for given aerodynamic and load conditions.

Specifically, counterweight assembly 22 is attached to root 24 of the propeller blade. An operating pin assembly 26 having a cam follower is also attached to root 24 and is engagable by a yoke plate 28. This yoke plate is movable along axis 18 and is biased by a governor spring 30 also mounted about axis 18. Preferably, a single yoke plate and a single governor spring control the pitch of all propeller blades on hub 10. In especially preferred embodiments, four such blades will be equally spaced about hub 10 in a conventional manner. In this way, blade pitch is synchronized and controlled with a minimum of moving parts.

The present invention relates to a method and apparatus for stopping and restarting the RAT during flight. RATs are often connected to electric generators and/or hydraulic pumps or motors. When such power is not needed, RAT rotation can be stopped. To this end, the present invention provides a braking mechanism that simultaneously stops hub rotation, shifts blade pitch toward a feathered position and stores the energy needed to restart the RAT.

Specifically, yoke plate 28 is incorporated in a ball screw/nut structure mounted about axis 18. Ball screw portion 40 carries yoke plate 28 as a flange thereof and is slidable along axis 18. Ball nut portion 42 supports ball screw portion 40 and is rotatable about axis 18. Ball nut portion 42 is connected to a brake drum 44 via a splined connection that permits relative sliding movement between these two components along axis 18. Brake drum 44 is formed with a rearward flange 46, and a collar spring 48 is located between flange 46 and ball nut portion 42 to bias the ball nut portion away from that flange.

Brake drum 44 is also formed with a conical braking surface 50 which is, for example, rearwardly inclined. A conical brake 52 is mounted opposite surface 50 and is biased into engagement with surface 50 by brake springs 54. An electromagnetic solenoid 56 is mounted adjacent conical brake 52 and is fixed relative to pod 12 by support structure 58. A thrust bearing 60 is preferably mounted between flange 46 and that support structure.

To accommodate the relative movement of these components of the present invention in the manner described below, additional stops are preferably provided. Specifically, extend stops 62 are formed at the rear of ball screw portion 40 and intermediate the length of ball nut portion 42. Retract stops 64 are formed at the forward part of ball nut portion 42 and intermediate the length of ball screw portion 40. Further, a ratcheting arrangement 70 is formed at the forward part of ball screw portion 40 and a forward part of support structure 58.

That ratcheting arrangement includes a ratchet teeth element 72 slidably mounted by, for example, a spline on support structure 58. A bellows 73 or similar resilient member or spring is mounted to bias ratchet teeth element 72 towards ball screw portion 40. Corresponding ratchet teeth 74 are, for example, formed on the forward end of ball screw portion 40 to be engagable with ratchet teeth element 72. Teeth 74 and teeth element 72 are arranged such that when interengaged, hub 10 is permitted to rotate in the direction of normal propeller rotation (as when the blades are in a coarse pitch position), but reverse rotation is restricted by interlocking of the ratchet teeth.

FIG. 1 illustrates both principle operational modes of the present invention. The cross section above axis 18 shows the feathered mode, and the cross section below axis 18 shows the governing mode. In the governing mode, solenoid 56 is energized and brake 52 is thereby retracted away from surface 50, against the force of brake spring 54. Governing spring 30 urges yoke plate 28 rearwardly toward operating pin assembly 26 to establish the blade pitch of propellers 14, limited by engagement with retract stops 64. Hub 10 rotates as a result of the transmission of energy from the airstream to the propellers. Ball nut portion 42 and brake drum 44 rotate with hub 10.

To stop the RAT, the apparatus is shifted into the feathered mode. Solenoid 56 is de-energized or switched off. Brake spring 54 then forces brake 52 into engagement with surface 50. As a result, brake drum 44 and ball nut portion 42 stop rotating. However, since rotational energy is still exerted by hub 10, relative motion between ball screw portion 40 and ball nut portion 42 continues, with the result that ball nut portion 42 and brake drum 44 slide rearwardly toward thrust bearing 60 and ball screw portion 40 slides forward along axis 18 toward an extended position into engagement with extend stops 62. The sliding motion of ball screw portion 40 causes yoke plate 28 to translate and, thus, rotate the operating pin assembly about axis 20 and compress governor spring 30. This compression continues until ratchet teeth 74 and teeth element 72 are engaged. The rotation of the operating pin assembly causes the blades to rotate about axis 20 from fine pitch position A or any intermediate position to feathered position B. In doing so, the blades are decelerated by the airstream as they move to a position parallel with the direction of airflow. Ratchet arrangement 70 serves to prevent reverse rotation in this feathered mode, but not during normal operation (since ratchet teeth 74 and teeth element 72 only engage at the last increment of forward axial motion of ball screw portion 40).

In the feathered mode, the energy needed to restart the RAT has been stored in the governor spring because of its compression. To restart the RAT, it is only necessary then to re-energize solenoid 56 to retract brake 52 from surface 50 and permit rotation of brake drum 44. Governor spring 30 then causes ball screw portion 40 to move rearwardly such that yoke plate 28 rotates the operating pin assembly 26 and shifts the blades to a fine pitch position. In that position, aerodynamic torque is sufficient to accelerate the RAT and its load to the governing speed. Once in the governing speed range the retract stops are engaged and operation continues as in the governing mode.

Figure 2:
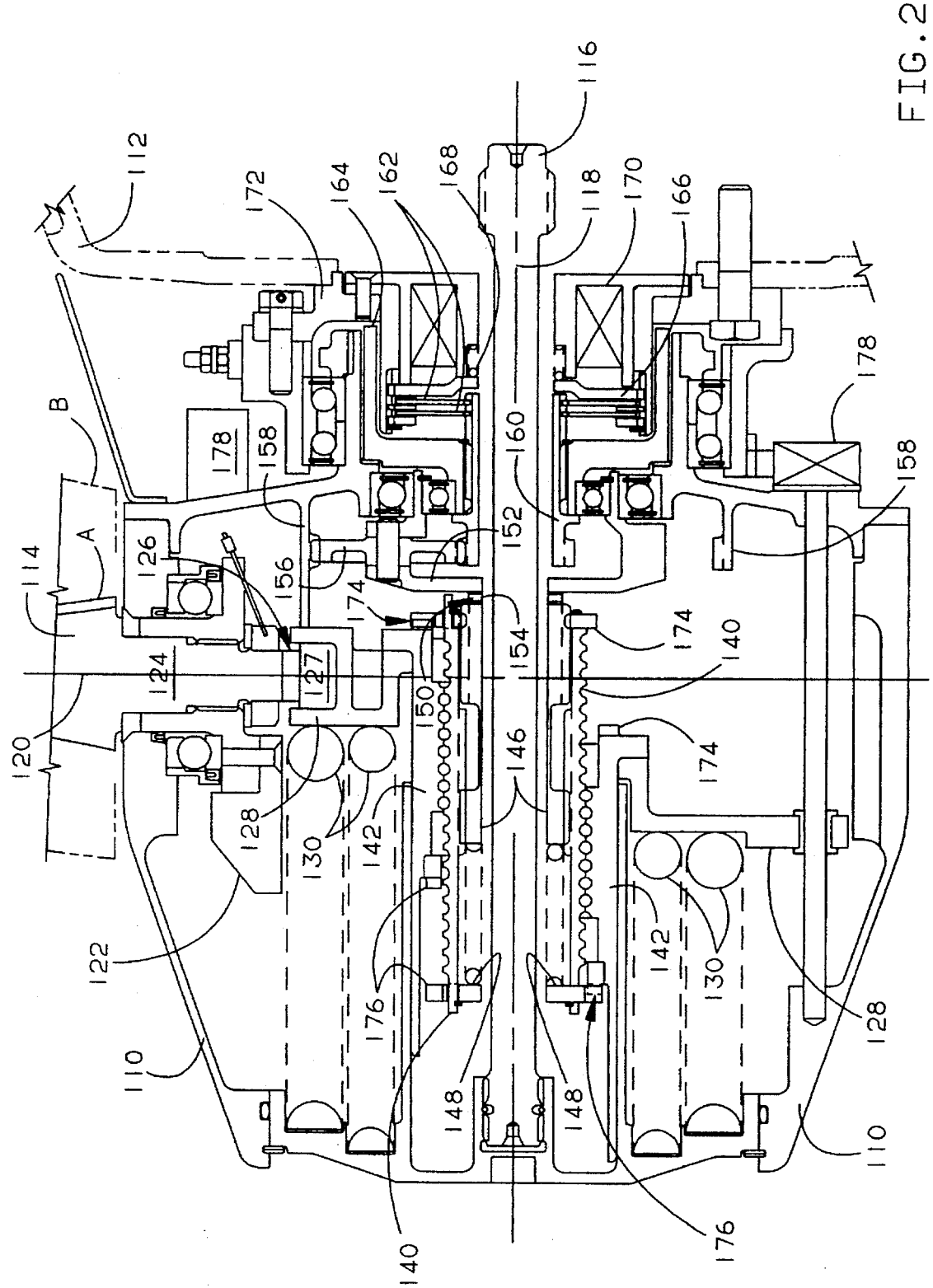
FIG. 2 is a cross sectional view of a portion of a RAT incorporating an alternative version of the present invention.

FIG. 2 shows another preferred embodiment of a similar RAT incorporating the present invention. By comparison, this second version is more preferred where it is desirable to reduce the necessary braking torque and relative speed of the ball nut portion and ball screw portion, permit greater aerodynamic braking, reduce the impact forces on the extend stops and more securely retain the restart energy in the governor springs. To achieve these additional objectives, the version of FIG. 2 includes a planetary gear arrangement and an overrunning ratchet.

Specifically, a hub 110 is provided on a forward end of pod 112. Hub 110 has a plurality of propellers 114 mounted therein. In FIG. 2 only a single propeller is illustrated for ease of viewing. A rotatable drive shaft 116 is fixed to hub 110 and extends rearwardly to provide a power source for pod 112. Hub 110 is rotatable about axis 118 and is so driven by the force imparted to propellers 114 as they move through the airstream.

Propellers 114 rotate about axis 118 to provide motive power through drive shaft 116 and are also rotatable about axis 120 to adjust the blade pitch. As with respect to the embodiment of FIG. 1, a representative pitch adjustment mechanism is illustrated in FIG. 2 which functions along similar principles. Specifically, counterweight assembly 122 is attached to root 124 of the propeller blade. Operating pin assembly 126, having a rotatable cam member or roller 127 is also attached to root 124. Yoke mechanism 128 engages cam member 127 and is biased by one or more governor springs 130. Yoke mechanism 128 and governor springs 30 are, for example, mounted for sliding movement along axis 118. As with the previously discussed embodiment, these axial governor springs preferably control the pitch of all propeller blades on hub 110.

Apparatus is also provided to permit stopping and restarting of the RAT in flight through feathering of the propeller blade pitch, braking rotation of the RAT hub and storage of the necessary restart energy. Specifically, yoke mechanism 128 is mounted to a ball nut portion 142 which is disposed about axis 118. Ball nut portion 142 is slidable along axis 118 and supports ball screw portion 140 which is rotatable about axis 118.

Overrunning ratchet 146 is mounted to ball screw portion 140 by a splined connection that permits relative sliding of these components along axis 118. Spring 148 is mounted between end walls of ratchet 146 and ball screw portion 140 to bias these components apart along axis 118. End face 150 of ratchet 146 is formed with inclined teeth. A carrier member 152 is provided with matingly inclined teeth 154 for interengagement with the teeth on end face 150. Spring 148 serves to bias those teeth into interengagement.

Carrier member 152 supports planetary gears 156. Although only a single such planetary gear is shown in FIG. 2, it is preferable that a plurality of such gears (three, for example) be employed in hub 110. Planetary gears 156 are bounded by ring gear 158, which is fixed relative to hub 110. Planetary gears 156 also engage sun gear 160. This sun gear is rotatable about axis 118 and rotatable relative to hub 110 and drive shaft 116.

Sun gear 160 is fixedly connected to brake plates 162 and flywheel 164. Brake member 166 is disposed so as to be selectively engagable with brake plates 162. Brake spring 168 is provided to bias brake member 166 into engagement with brake plates 162. An electromagnetic solenoid 170 or similar device is mounted adjacent brake member 166 and is fixed relative to pod 112 by connection to support structure 172.

To accommodate relative movement between ball nut portion 142 and ball screw portion, retract stops 174 and extend stops 176 are provided. These stops are provided at positions analogous to the stops of the embodiment of FIG. 1. To prevent reverse rotation in the feathered mode, an antiback drive ratchet device 178 (shown schematicly) is attached between hub 110 and support structure 172. This device includes, for example, a Sprag-type clutch.

As with FIG. 1, the view of FIG. 2 illustrates both principle operational modes of the RAT using the present invention. The cross section above axis 118 shows the governing mode, and the cross section below axis 118 shows the feathered mode. In the governing mode, solenoid 170 is energized to retract brake member 166 from brake plates 162 against the force of spring 168. Governing springs 130 urge yoke mechanism 128 rearwardly to move cam member 127 to establish a predetermined desired fine pitch for the propeller blades. Hub 110 then rotates as a result of transmission of energy from the airstream to the propellers.

Rotation of hub 110 causes ring gear 158 to rotate and, thereby planetary gears 156 and sun gear 160 about axis 118. Flywheel 164 and brake plates 162 similarly rotate with sun gear 160 about axis 118. At the same time, ball nut portion 142 and ball screw portion 140 also rotate with hub 110 and without relative movement therebetween.

To stop the RAT, solenoid 170 is turned off, and brake member 166 engages brake plates 162. As a result, sun gear 160 stops rotating and becomes fixed with respect to pod 112. At that instant, however, the kinetic energy of hub 110 continues to cause rotation of ring gear 158 and ball nut portion 142. Planetary gear 156 is thereby caused to rotate between ring gear 158 and sun gear 160. Thus, carrier member 152 continues to rotate at an intermediate speed between that of ring gear 158 and sun gear 160. Since ball screw portion 140 is driven by carrier member 152 through the engagement of end face 150 of ratchet 146 and teeth 154 of the carrier member, ball screw portion 140 also rotates at that intermediate speed.

Those of ordinary skill in the art will now understand that the specific rotational speeds available are readily determinable by the specific planetary gear ratios chosen in particular embodiments. In general, however, it has been found to be advantageous to select those gear ratios so as to create a low rotational speed differential between the ball nut portion and the ball screw portion. This low differential is useful as a practical matter to help ensure proper ball screw operation over sustained periods of time.

As with the version of FIG. 1, relative rotational motion between ball nut portion 142 and ball screw portion 140 causes axial sliding of the ball screw portion which leads to compression of governor springs 130. Likewise, yoke mechanism 128 is moved to permit the blade pitch to shift to a feathered position. By comparison with the version of FIG. 1, however, use of the planetary gear arrangement reduces the brake torque needed by the mechanism during feathering in order to compress the governor springs. Also, the number of hub revolutions needed to cause full feathering is increased, thus permitting more time for aerodynamic deceleration or braking by the airstream and reducing the magnitude of end of travel impact in the RAT, such as at extend stops 176.

Again, in the feathered mode the energy needed to restart the RAT has been stored in the generator spring compression. To restart the RAT, solenoid 170 is re-energized to enable governor springs 130 to backdrive the feathering mechanism. In part, the backdriving speeds attained are dependent upon the composite inertia of the turbine, hub and feather mechanisms as felt by the ball nut portion. In general, if that interia is too low, the backdriving speeds will strain or exceed the capacity of the ball screw device. Also, in designing particular embodiments of the present invention, it is important to keep in mind that the reflection of inertia between the sun gear and the ball nut portion is proportional to the square of the gear ratio between them.

Thus, the present invention also provides the addition of flywheel 164 to permit backdriving speeds to be controlled to acceptable levels. Such control of backdriving speed also permits the majority of excess potential energy from governor springs 130 to be converted into kinetic energy of the planetary gear system components and flywheel 164.

Specifically, as governor springs 130 urge yoke mechanism 128 and ball nut portion 142 rearwardly along axis 118, the propeller blades are shifted to a fine pitch position which will allow them to extract energy from the airstream and start rotation of hub 110. However, prior to rotation of hub 110, sliding movement of ball nut portion 142 causes immediate rotation of ball screw portion 140. Through ratchet 146, ball screw portion 140 is always connected to carrier member 152. The teeth of end face 150 and teeth 154 are formed such that rotation of ball screw portion 140 at least during restart (or unfeathering) causes rotation of carrier 152 by positive torque transmission. Since at this point in time sun gear 160 and flywheel 164 are free to rotate, rotation of ball screw portion 140 causes the transfer of excess energy (excess in the sense that it is not used to change blade pitch) through carrier 152 to flywheel 164.

As governor springs 130 push ball nut portion 142 into retract stops 174 and axial motion ends, continued rotation of ball screw portion 140 also ends. However, the teeth of end face 150 and teeth 154 are formed to permit slippage therebetween by disengagement of torque transmission as spring 148 is compressed. In this way, carrier member 152, sun gear 160 and flywheel 164 can continue to rotate and dissipate the excess kinetic energy without causing the stops, overrun ratchet or gear teeth to be formed to absorb that energy.

Thus, the present invention permits use of a more robust design for RAT control at a minimal cost. Higher energy sources can be safely used to increase reliability of restarting without degrading the useful life of the RAT components or requiring higher cost materials to be employed. Such arrangements are thereby less sensitive to use in adverse environments, and at the same time, easier to manufacture and refurbish since fewer parts are needed and the design is less dependent on tight tolerances. At the same time, hazardous failure modes are avoided. For example, if the feathering mechanism becomes inoperative, the fail safe position can remain as the normal governing mode.

Although the present invention has been described above in detail, the same was by way of illustration and example only. It will now be recognized by those skilled in the art that numerous other applications and embodiments can apply the principles of the present invention. For example, instead of use in a RAT in an airstream, this invention can be applied to propeller driven motors or generators in a more viscous fluid stream. Likewise, common design features, such as wear-in debris holes and vent passageways, can be included if desired or advantageous with the choice of materials or environments. Accordingly, the spirit and scope of the present invention are only limited by the terms of the attached claims.

We claim:

1. A control mechanism for a propeller driven device that provides for stopping and restarting of that device within a fluid stream comprising:

a rotatable hub;

at least one propeller mounted in said hub;

a governor for adjusting the blade pitch of said propeller;

braking means connected to said hub for selectively braking rotation of said hub and causing the blade pitch of said propeller to move toward a feathered position; and means connected to said governor for storing restart energy in said governor to cause the blade pitch of said propeller to move out of a feathered position when said braking means releases said hub.

2. A propeller driven apparatus for obtaining power from a fluid stream, comprising:

a rotatable hub, at least one propeller attached to said hub, first means within said hub for changing the blade pitch of said propeller, second means within said hub for stopping and restarting rotation of said hub, and said first means having an operative connection to said second means which permits said first means to supply restart energy to said second means.

3. A propeller driven apparatus for obtaining power from a fluid stream, comprising:

a rotatable hub, at least one propeller attached to said hub, first means within said hub for changing the blade pitch of said propeller, second means within said hub for stopping and restarting rotation of said hub, said first means having an operative connection to said second means which permits said first means to supply restart energy to said second means, and said first means including at least one governor spring for aiding in establishing the blade pitch of said propeller at a predetermined level according to the fluid stream flow rate, said second means being connected to said governor spring to compress said governor spring as rotation of said hub is stopped, and locking means being provided in said second means for retaining said governor spring in a compressed position until rotation of said hub is restarted.

4. The apparatus according to claim 3 wherein said second means includes a ball screw/nut arrangement for translating hub rotational energy into axial force to compress said governor spring.

5. The apparatus according to claim 4 including selectively actuatable hub braking means for stopping rotation of said hub.

6. The apparatus according to claim 5 wherein said locking means is connected to said hub braking means.

7. The apparatus according to claim 3 wherein said second means is connected to prevent said governor spring from aiding in establishing the blade pitch of said propeller when rotation of said hub is being stopped, such that blade pitch changes as rotation of said hub slows down.

8. An aircraft having an air driven turbine as a power source, that turbine including a hub which is rotatable about a longitudinal axis, a plurality of propeller blades attached to said hub and rotatable about respective radial axes to vary the pitch of those blades, a spring-biased governor arrangement within said hub for adjusting the pitch of those blades, and means for stopping and restarting rotation of said hub, that means comprising:

a braking system within said hub which is selectively actuatable to stop rotation of said hub, a restart energy storing means connected to the spring of said governor arrangement for translating rotational energy of said hub into potential energy for restart by compression of said spring as rotation of said hub is being stopped, and locking means connected to said spring for preventing release of said potential energy until said braking system releases said hub for rotation.

9. The aircraft according to claim 8 wherein said spring is mounted about said longitudinal axis and is disposed to provide biasing for simultaneously adjusting the pitch of all blades.

10. The aircraft according to claim 9 wherein said restart energy storing means includes a ballscrew/nut device mounted about said longitudinal axis and having a first component which is rotatable and a second component which is slidable, said first component being connected to said braking system and said second component being engagable with said spring when said braking system is actuated to stop rotation of said hub.

11. The aircraft according to claim 10 wherein said first component is connected to said braking system through a transmission device which includes a planetary gear system and a flywheel element is connected to said gear system for receiving excess restart energy.

12. The aircraft according to claim 11 wherein said first component is also connected through said planetary gear system to said hub so as to rotate at a reduced speed with respect to said hub.

13. A turbine, for generating power from a surrounding fluid stream, comprising:

a hub which is rotatable about a longitudinal axis, a drive shaft connected to the hub and rotatable along with the hub, a plurality of propeller blades retained by the hub and extending radially outward from the longitudinal axis, those blades being movable so as to vary the pitch of the blades with respect to the fluid stream, a spring device mounted about the longitudinal axis for biasing all of the blades towards a predetermined pitch, a planetary gear assembly within the hub having a ring component, a sun gear and a plurality of planet gears, that ring component being connected for rotation with the hub, that sun gear being rotatable about the longitudinal axis, and the planet gears being mounted on a carrier element, a braking system mounted within said hub and actuatable to selectively engage the sun gear, a flywheel element connected to and rotatable with the sun gear, a ballscrew/nut device mounted about the longitudinal axis and having a first component that is rotatable about the longitudinal axis and a second component that is slidable along the longitudinal axis, the first and second components being operatively connected such that the rotation and sliding motion of those components cannot occur independently, the first component is engagable with the carrier element through a ratchet teeth portion formed on at least one of those two members, and the second component is engagable with the spring device as a result of the sliding motion of the second component.

* * * * *